(12) United States Patent
Witt et al.

(10) Patent No.: US 6,971,018 B1
(45) Date of Patent: *Nov. 29, 2005

(54) FILE PROTECTION SERVICE FOR A COMPUTER SYSTEM

(75) Inventors: Wesley A. Witt, Redmond, WA (US); Mark J. Zbikowski, Woodinville, WA (US); Lonny D. McMichael, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/560,788

(22) Filed: Apr. 28, 2000

(51) Int. Cl.[7] .......................... H04L 9/00; G06F 17/30; G06F 17/60
(52) U.S. Cl. .................. 713/187; 713/176; 713/200; 705/57; 707/203
(58) Field of Search ................................ 713/165, 194, 713/150, 164, 168, 176, 181, 189, 193, 200–202, 713/187; 380/201; 707/200–204, 1, 9, 100; 717/168–173; 705/50, 75, 80, 64–69, 51, 57, 58

(56) References Cited

U.S. PATENT DOCUMENTS

| | | | | |
|---|---|---|---|---|
| 4,757,533 A | * | 7/1988 | Allen et al. .................. 713/192 |
| 4,884,211 A | * | 11/1989 | Kishi et al. .................. 700/180 |
| 5,144,659 A | * | 9/1992 | Jones .......................... 713/165 |
| 5,557,518 A | * | 9/1996 | Rosen .......................... 705/69 |
| 5,586,301 A | * | 12/1996 | Fisherman et al. .......... 711/152 |
| 5,604,862 A | * | 2/1997 | Midgely et al. ................ 714/6 |
| 5,703,949 A | * | 12/1997 | Rosen .......................... 705/65 |
| 6,205,436 B1 | * | 3/2001 | Rosen .......................... 705/65 |
| 6,308,274 B1 | * | 10/2001 | Swift ........................... 713/201 |
| 6,353,926 B1 | * | 3/2002 | Parthesarathy et al. ..... 717/170 |
| 6,618,735 B1 | * | 9/2003 | Krishnaswami et al. .... 707/203 |
| 6,625,623 B1 | * | 9/2003 | Midgley et al. ............. 707/204 |

OTHER PUBLICATIONS www.dll-files.com. 1998.*
Microsoft Knowledge Base Article- 222193. Description of the Windows File Protection Feature.*
Grenyer, Paul. Copy on Write.*
Rogue wave Software. Copy on Write. 1996.*
Kim, Gene H. The Design and Implementation of Tripwire: A File System Integrity Checker. 1994.*
Haerder et al, "Principles of Transaction-Oriented Database Recovery", Dec. 1983, Computing Surveys, vol. 15, No. 4, p 287-317.*
Blakley, "Security Requirements for DCE", Oct. 1995, Request for Comments 8.1, p. 1-27.*

(Continued)

*Primary Examiner*—Ayaz Sheikh
*Assistant Examiner*—Christopher Revak
(74) *Attorney, Agent, or Firm*—Law Offices of Albert S. Michalik, PLLC

(57) ABSTRACT

A method and system that protects selected system and other files, by preventing changes to those files. In an asynchronous alternative, the change is prevented by copying back the original file when a protected file is changed, as known via an asynchronous notification. In an alternative synchronous embodiment, the change to the file is prevented from occurring. In the asynchronous notification alternative, a directory change notification notifies a file protection service whenever a file that has possibly changed is closed, providing the file identity as part of the notification. The file protection service determines from the file identify whether the file has been deemed protected. If protected, the file protection service prevents any actual change by verifying whether the protected file changed, such as by analyzing the file's contents against known valid contents. If not valid, the file protection service restores a saved copy that is itself verified.

39 Claims, 9 Drawing Sheets

OTHER PUBLICATIONS

Scot et al, "Special Report: Inside Windows Me Beta 3" May 4, 2000, Winmag.com, Dialog Text Search, p. 1-9.*

Geyer, "Software enhances flash efficiency"1998, Electronic Buyers News, N 1121, Dialog Text Search, p. 26.*

* cited by examiner

FILE PROTECTION SERVICE FOR A COMPUTER SYSTEM

FIELD OF THE INVENTION

The invention relates generally to computer systems, and more particularly to files stored on a computer system.

BACKGROUND OF THE INVENTION

In contemporary operating systems such as Microsoft® Corporation's Windows® operating systems, applications rely on system files, including those in the form of dynamic link libraries (DLLs) or the like, for various features and/or application programming interfaces (APIs). To ensure that an operating system is stable, the operating system code and system files are exhaustively tested, debugged and verified, resulting in particular versions of system files known to be highly stable. Those particular versions of system files are then shipped with the operating system.

However, because applications rely on system files, of which hundreds of thousands may be available, applications often ship versions of system files (e.g., DLLs) therewith that the application is known to work with, often because the application vendor has no idea as to what operating system the application will be installed under. Installing application software thus results in the installation of various versions of operating system DLLs and executables to a user's computer, some of which may be incompatible with the operating system and/or other applications on the system. This mismatched set of components causes an unknown and unreliable state to exist on the user's computer, a problem often referred to in the industry as "DLL Hell."

By way of example, consider a user who installs an operating system such as Windows® 2000 on a given computer, and later starts browsing the web with that computer. While browsing the web, an interesting software application is found, downloaded to the computer, and then installed. However, during the installation, the application installer replaces the known, stable copy of MSVCRT.DLL that is in the user's system directory, with an earlier, or possibly later (and thus possibly untested), version. In many instances, the copy of the DLL that is installed is not fully compatible with the operating system and/or other applications already installed on the user's computer.

As a result, the user's computer will sometimes fail and =become less reliable, both in the operating system and in applications. One solution has been to use versioning techniques for system files, e.g., never copy over a higher-numbered version of a DLL. However, this has its own drawbacks, because version stamping is often done incorrectly, e.g., the versions are not properly identified in the DLLs relative to other versions. Moreover, for proper operation, providing new versions requires that those versions are backwards compatible, which even when it could be done correctly, is very difficult to get anyone to put into practice. Removing the application that is suspected of having made a system unstable does not eliminate this problem, and often the user's only recourse to an unstable system is to reinstall the operating system, and sometimes reinstall some of the applications.

Some systems prevent upgrading of system files by using file system security to prevent modification. This falls short because typically, the administrator (or power user) is the person installing the new application, which means that the user is allowed to modify the files. Also, system upgrades/patches are more difficult, since the security prevents correct and desired modifications of system files.

SUMMARY OF THE INVENTION

Briefly, the present invention provides a method and system that protect selected system and other files, by preventing changes to those files. In one embodiment, the change is prevented by copying back the original file when a protected file is changed, as known via an asynchronous notification. In an alternative embodiment, the change to the file is detected before it occurs, i.e., synchronously, whereby the original file can be preserved, or the change can be prevented from occurring.

More particularly, in the asynchronous notification alternative, a directory change notification mechanism is instructed to watch a set of one or more specified directories. The directory change notification mechanism notifies a file protection service whenever a file that has possibly changed is closed, providing the filename as part of the notification. The file protection service determines whether the file is protected, such as by looking for the filename (e.g., a hash thereof) in a data structure maintaining filename information of protected files. If protected, the file protection service prevents any actual change by verifying (e.g., via a verification mechanism) whether the protected file changed. To this end, the verification mechanism may call a cryptographic API, which makes a determination by analyzing the file's content signature against known good contents, e.g., by comparing a cryptographic hash of the file contents against a catalog of known valid file hashes, and returning information as to whether the new file is verified as valid. Note that as used herein the phrase "not valid" or the like does not necessarily mean that a file is bad or will cause problems, only that it has not been verified, and if installed may lead to an unstable system. If not a valid change, the file protection service restores a saved copy (that is itself verified) from one of a number of possible sources, e.g., an on-disk cache, a network share, an operating system CD, and so forth.

Exceptions are provided to enable certain critical protected files to be replaced when necessary, and to allow other, "less-protected" files to be changed. For example, a critical system file that needs to be replaced can have its information added to the catalog, whereby it will be verified as valid after the file is written and closed. Less protected files, such as certain third party software drivers, may be allowed to be changed by the user, which may include first notifying the user via a warning prompt or the like and receiving user approval. For security, signatures may be required to allow such exceptions to be implemented. A scan utility is described which enables a user to restore such changed files to a set of protected files that are known to be good.

In the other alternative, referred to herein as a synchronous alternative, changes to a protected file are detected by the operating system (including, but not limited to, file system component, security component, or filter drivers) before they occur and one of several actions may take place. First, the original file may be saved to a separate, protected location and the change allowed to proceed. Upon subsequent user direction or by rules implemented in the file protection service, this saved version may be returned to the original location. Second, the change may be temporarily kept (e.g., via a copy-on-write process). Depending on user selection and/or other rules, the temporarily maintained change may be discarded, leaving the original version intact, or the change may be copied over the original. In cases where the original file is left intact, (or restored from a preserved location), a success status indication may be returned to the application so that it believes its change was made when it was not. Alternatively, a failure status indication may be returned to the application. This will cause the application install to fail, and notify the user of this problem.

One way to achieve this failure action is to use a security component. For example, the security descriptors of protected files may be marked in a special way, requiring the application process to have a specific capability enabled before a change is allowed. Any application that attempts direct modification of the files will not have this capability enabled, and the security system will reject the modification. For the application to successfully modify the file, a new system service may be provided that performs the cryptographic verification, e.g., in the operating system kernel. If the verification succeeds, the capability is enabled, the system service (not the application) performs the modification, and then the capability is disabled before control is returned to the application.

Other advantages will become apparent from the following detailed description when taken in conjunction with the drawings, in which:

DETAILED DESCRIPTION OF THE INVENTION

Exemplary Operating Environment

Figure 1:
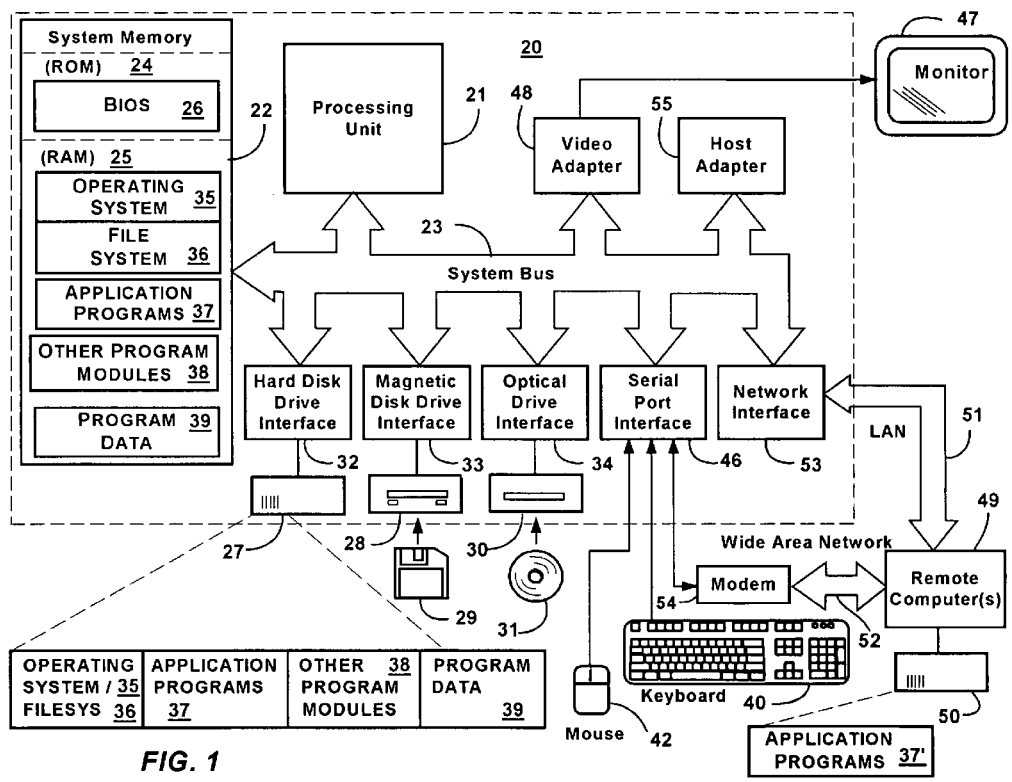
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types.

Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (such as Microsoft Corporation's Windows® 2000, formerly Windows NT®, operating system). The computer 20 includes a file system 36 associated with or included within the operating system 35, such as the Windows NT® File System (NTFS), one or more application programs 37, other program modules 38 and program data 39. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

The present invention is primarily described herein with respect to the Windows® 2000 (formerly Windows® NT®) operating system and the protection of system files, including DLLS. However, as can be readily appreciated, the present invention is not limited to any particular operating system or files, but rather may be used with any operating system, and moreover, has many uses in general computing.

File Protection

Figure 2:
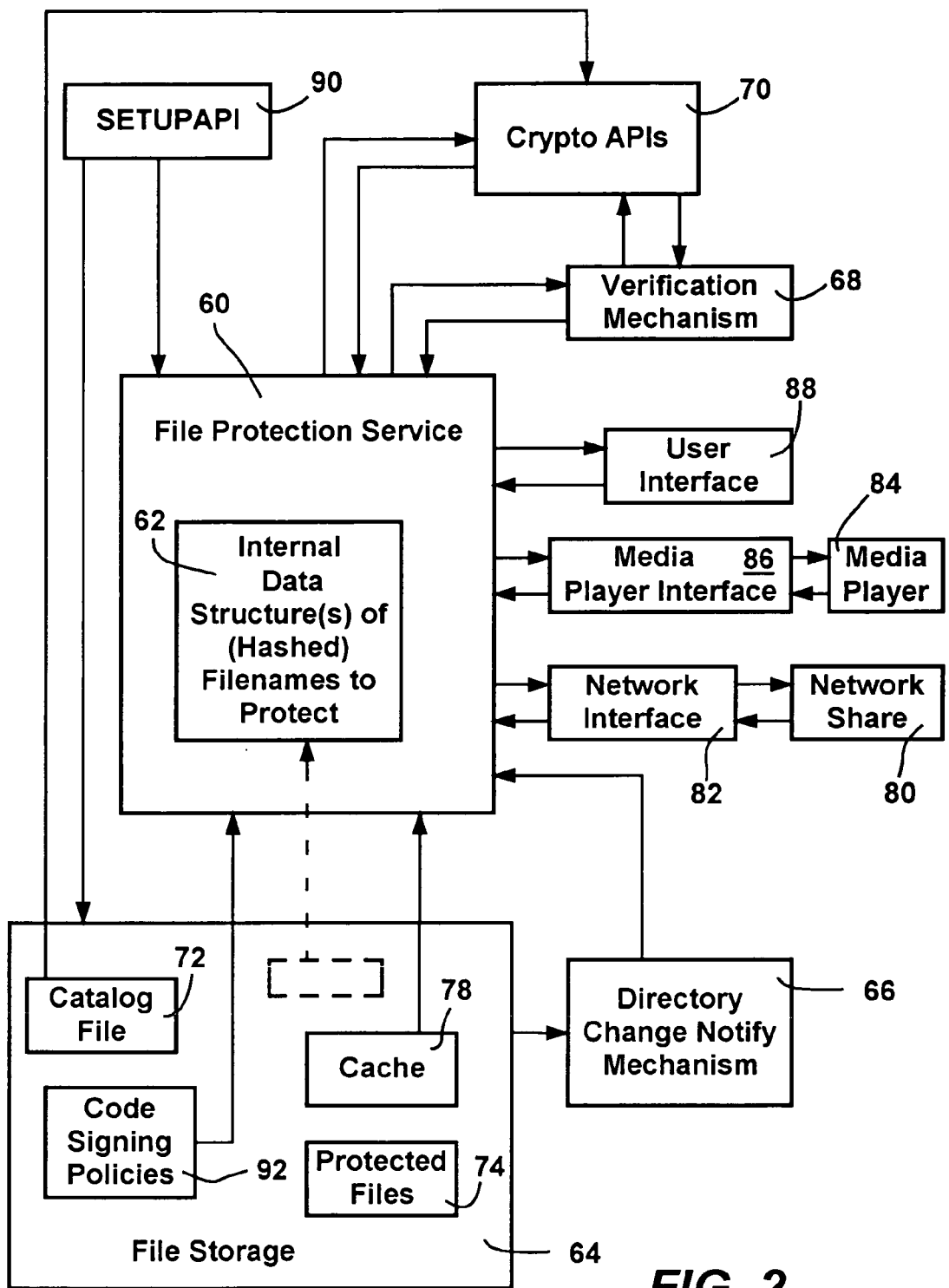
FIG. 2 is a block diagram generally representing a general architecture for protecting files in accordance with an aspect of the present invention.

Turning to FIG. 2 of the drawings, there is shown a file protection service 60 for protecting selected files in accordance with an aspect of the present invention. In general, the files that are protected comprise critical system files and other important files such as drivers, although as will be understood below, there is no reason that virtually any file may not be similarly protected. To protect the files, the file protection service 60 maintains a list or the like identifying the files that are to be protected, in an in-memory data structure 62. For performance reasons, the data structure 62 is loaded into memory from persistent storage (as indicated by the dashed box in the file storage 64 FIG. 2), and is preferably arranged as a balanced binary tree that is optimized for lookup. In one embodiment, the tree includes hashed filenames. As can be appreciated, the tree can be arranged in many ways, such as numerically, alphabetically, by frequency of hits, or some other way that tends to increase lookup speed.

A change notification mechanism 66 is provided, in general, to monitor files for changes thereto. In one implementation, the change notification mechanism 66 returns a name of a changed file to the file protection service 60 on the close of that file. One such mechanism is a Windows® 2000 operating system feature known as "directory watch," which when given a set of one or more directories or directory trees, watches any corresponding file system volumes for possible changes to files therein, and provides a notification including the filename on such a change, at the close of the file.

In the case in which filenames are returned, the in-memory data structure 62 includes a corresponding list of hashed filenames identifying the protected files, for fast hash-based lookup. In alternative implementations, a change notification mechanism may return a system-unique file identifier or the like, whereby the data structure 62 would instead include file identifiers of protected files, or some hash thereof. Note that the change notification mechanism 66 is preferably narrowed in its watch scope so as to only watch certain directories, (or possibly even only certain files), whereby every file that is changed on a given system does not result in a notification and resultant search of the data structure 62. It is alternatively feasible to provide an attribute or the like with the file that indicates that the file is protected, whereby the file system, for example, may provide the notification, or even run the protection mechanism software. However, the asynchronous service described herein which leverages the existing directory watch feature, operates upon notifications and is independent of any given file system, and thus can work with the Windows NT® filesystem (NTFS), the FAT file system, and so forth, even when multiple file systems are present on a given computer system.

As will be described below, there are certain instances when a protected file may be validly changed, in which case the file protection mechanism will not put back the original protected file that was copied over (in the asynchronous alternative), or will allow (i.e., not prevent) the change (in the synchronous alternative). A verification mechanism 68, in conjunction with a set of cryptographic APIs 70 are provided to make this determination. Note that the verification mechanism 68 may be incorporated into the cryptographic API mechanism 70, or may place calls to it. A suitable cryptographic mechanism including a cryptographic application program interface is described in U.S. Pat. No. 5,689,565, herein incorporated by reference.

Prior to releasing a version of an operating system, a determination is made for each file released therewith as to whether that file is protected. The identities of these files are stored in the data structure 62. Also, a file signature mechanism or the like hashes each file, for example via a hash algorithm such as SHA1 or MD5, cryptographically encodes it into a unique (or essentially unique) signature, and stores the signature in a catalog file 72 released with the operating system and maintained in the system file storage 64 upon installation of the operating system, along with the protected files 74 and other files.

In accordance with one aspect of the present invention, when a protected file has been changed (or in the synchronous alternative, may be changed), the file protection service 60 communicates with the verify mechanism 68 (e.g., WinVerifyTrust) and the cryptographic API set 70 to determine whether a change is valid. In general, the file contents including any possibly changed data is cryptographically hashed into a unique signature, and sent to the cryptographic APIs 70 to request whether the signature is valid. The cryptographic API set 70 looks up the signature in the catalog file, and returns information as to whether the signature matches one that is known to be valid. In the asynchronous case, if valid, the data is left alone, while if invalid, a copy of what is believed to be valid is located. If (following a similar signature verification) the located copy is valid, the copy is copied over the changed file data, thereby restoring the protected file.

To restore a protected file that has been copied over, in one embodiment, the file protection service 60 first attempts to locate the file in a cache 78 of operating system files. The cache 78 of all (or at least most) operating system files is normally stored in file storage 64, and is maintained up-to-date, e.g., files are replaced in the cache 78 as well as in other locations as needed, such as when fixes are downloaded to the system. Although normally local and thus generally treated as a local cache 78 herein, there is no reason that a cache 78 may not be maintained remotely and accessed via a network connection. The cache 78 size is dependent on the amount of available disk space, (i.e., it has a quota), and the data in the cache 78 is considered volatile. As a result, because the cache 78 is volatile and accessible by the user, the user, system or some other party can replace the files therein, delete the cache 78 or selected files therein, and so forth. Because of this, a copy of a protected file may not be present, and even if present, is not trusted. Thus, if found, the found copy is similarly verified via the signature process before it can be copied back to the set of protected files 74.

If the protected copy found in the cache 78 is not valid, or was not in the cache 78, the file protection service 60 looks elsewhere for a copy. If the copy was installed from a network share 80, the file protection service 60 looks to the network share 80, e.g., via an API call or the like that provides access to the network share 80 through a network interface 82. Again, the copy at the network share 80 may have since changed, so if found, the copy of the protected file is verified via the verification mechanism/cryptographic API set 70. If valid, the network share copy of the protected file is used to restore the pre-changed state of the system.

If the installation was not from a network or if the protected copy found in the network share 80 is not valid or was not found, the file protection service 60 continues by looking to a local media reader 84 (via its interface 86) for a copy, such as a CD-ROM, DVD-ROM or the like. Again, this may be accomplished via an API call or the like. The file protection service will prompt for the media if not found, via a user interface 88. Again, any located copy is verified as valid in the above-described manner before it is restored. If a valid copy of the file cannot be found, the user can cancel the restoration of the file via the user interface 88, whereby the user preferably will be warned via a further prompt that the system is now considered unstable.

In the synchronous case, the (possibly) changed file data is separately saved to a separate, protected location, such as preserved via a copy-on-write process, and then either used or discarded depending on whether the change is allowed or prevented by the file protection service. Alternatively, the original file can be copied to a separate, protected location, the change allowed to occur, and the original copy restored from the separate, protected location, or discarded if not restored. The data is similarly cryptographically hashed (e.g., when the file is closed) and sent to the cryptographic API mechanism 70. If determined to be valid thereby, the file protection service 60 causes the new file data, which has been separately preserved via the copy-on-write process, to be written to the file. If not valid, the copy-on-write data is discarded. Whether kept or discarded, however, the entity requesting the change, e.g., a setup mechanism such as a setup installer (SETUP API) 90, may be told that the copy succeeded (e.g., via a returned errorcode). In this manner, the file protection service 60 operates transparently with respect to the setup mechanism 90. Alternatively, a failure may be returned. Note that in the synchronous case, the original, valid copy may not be overwritten, (unless another valid copy is allowed to overwrite it), or, if overwritten, the valid copy is first preserved in a known, secure location, and thus there is no need to access the cache 78, network share and/or media player for a valid copy.

One time that a new/different valid copy of a protected file is allowed to be installed is when an important fix or upgrade to a protected system file or the like is necessary. Such a fix/upgrade also should have been thoroughly tested before being released, and thus should be known to be relatively stable. In any event, the cryptographic API set may be called (with a proper manufacturer's signature for security purposes) to add a new cryptographic hash signature for the new protected file as a new catalog, whereby it will be considered valid when it is installed. Note that the file protection service 60 would otherwise copy over or alternatively reject such a change. Further, note that the hash is added as a new catalog, whereby both the previous and new versions are considered valid, however it is feasible to replace an existing hash with a new hash.

For certain files, a policy is set on systems to block replacement thereof, (to the extent possible, i.e., in the asynchronous case, replacement occurs only when the valid file cannot be found and the user cancels a request for it), unless another valid file is replacing it, as known via the catalog 72. Further, note that the cryptographic API mechanism 70 that checks for a manufacturer's signature before allowing the addition to the catalog 72 can be configured such that only one certain signature can make such a change, whereby, for example, an operating system vendor can control which files are considered valid. Alternatively, the cryptographic API mechanism 70 can be extended to accept one of a plurality of acceptable signatures when adding a file's cryptographic hash signature to the catalog 72, whereby multiple parties can enable the change of protected files.

Another time that a new/different valid copy of a protected file may be installed is when the file is a third party driver or the like. Such files are not part of the operating system, but are protected by the file protection service. Indeed, to be part of the protected file set 74 when the operating system ships, the drivers also undergo thorough testing to ensure a stable system. However, there are times when such a driver needs to be replaced/upgraded, before it undergoes the thorough testing necessary to have its cryptographic hash added to the catalog file as a known valid file. For example, the driver manufacturer may need to load an upgraded driver to test it, as will the testing programs/mechanisms that will test that version of the driver to ultimately determine whether it is considered sufficiently stable to be valid. The replacement of such a "less-protected" file is thus allowed rather than prevented by the file protection service 60, however a warning prompt first may be issued, dependent on code signing policies 92. For example, files in certain device classes should not ordinarily be changed without first having been verified as stable, (e.g., by a verifying entity), and a warning may be issued before replacing these files even if the policy had been set to ignore such warnings. However, classes of files that are not verifiable may not receive such a warning if their policy is set to ignore such changes, although in one implementation, a warning always occurs. The installation of a driver and driver signing policies are controlled by a driver installer 108 (FIG. 3), as described in more detail below.

Figure 3:
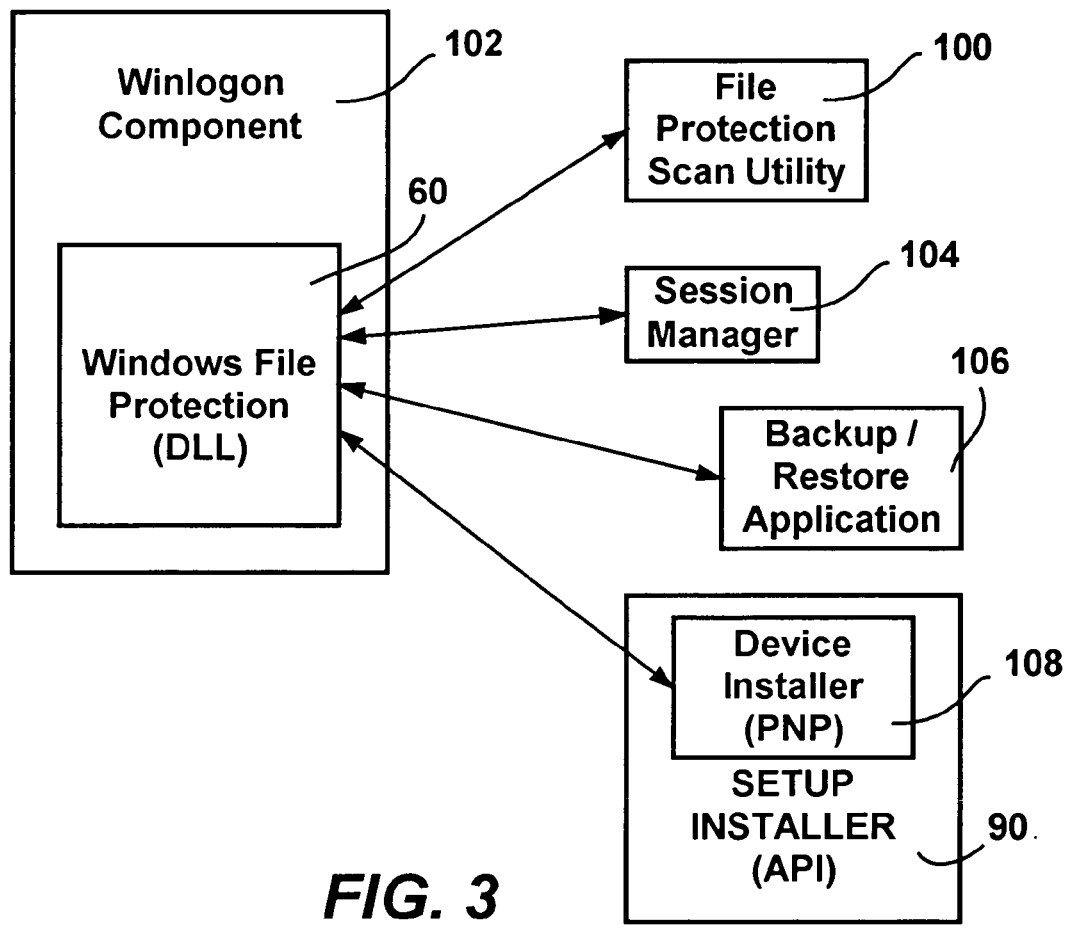
FIG. 3 is a block diagram generally representing components that utilize and otherwise may benefit from the file protection service of the present invention.

Because it is possible for a user to override the file protection service 60, such as when installing a less-protected driver, or when the cache 78, network share (if any) or media does not have a valid copy of a file, it is possible for a system to become unstable. In keeping with the present invention, there is thus provided a scan utility 100 as generally represented in FIG. 3. In general, when run, which may be on demand, in a background process, and/or on a schedule, the scan utility 100 will cause each protected file to be checked against the known valid file information stored in the catalog file 72. One way this may occur is to access each protected file in the set 74 thereof in file storage 64, which will cause the above-described mechanism to automatically perform the check. Another way is to have the utility 100 place a certain call or the like to the file protection service 62, which can walk a list of protected files calling the verification mechanism 68/cryptographic APIs for each one and restoring when necessary. The scan utility also may be run after initial installation, for example, automatically after a manufacturer configures a machine with an operating system and its applications (as part of a system preparation process).

FIG. 3 generally represents other uses of the file protection service 60. Note that in FIG. 3, the file protection service 60 is shown as running within a Winlogon component 102, e.g., as a DLL loaded in the Winlogon process 102 and run as a thread. In one implementation, this is done because both the Winlogon component 102 and the Crypto APIs 70 only work in a Win32 environment, and thus the Crypto APIs 70 are present when the Winlogon component 102 is present and thereby available to the file protection mechanism 60. This is not the case, for example, with the session manager 104 which can operate without the Win32 environment. However, it can be readily appreciated that the Crypto APIs 70 are primarily used for convenience, and that alternatively the file protection service of the present invention can include its own or otherwise access other cryptographic mechanisms, independent of any particular environment, whereby the service can be located virtually anywhere within a computer system, including independent of any other component.

As represented in FIG. 3, the session manager 104 uses the file protection service for a deferred rename operation. More particularly, contemporary operating systems allow a file that is in use to be replaced on a subsequent session, via a deferred rename operation. For example, a core operating system DLL will always be in use, and without this mechanism cannot otherwise be replaced. To this end, a new version of a file gets saved, and the operating system notes (e.g., in a registry) that the file should be replaced the next time possible, i.e., on the next re-boot when the session manager 104 is started. One of the session manager's first tasks is to process any such delayed renames that are listed. However, before it does this, it checks the list of protected files (e.g., in the data structure 62 or equivalent that it can load), and denies any change to a protected file. Note that the session manager 104 cannot call the crypto-APIs 70 at this time to verify the new file's signature, as the crypto-APIs 70 are not loaded at this time. To replace such a file via the session manager 104, a special flag may be set, in which case the session manager 104 will allow the change. Note that this flag is hidden and protected by the operating system vendor for security reasons, since there is no reason that such core operating system files should ever be changed without knowledge the operating system vendor.

A backup/restore mechanism 106 similarly needs to work with the file protection service 60, otherwise the system state cannot be restored. To this end, a file protection service API or the like may be provided, which when called, returns information as to whether a specified filename is a protected system file that needs to be restored by the backup/restore mechanism 106 in order to properly restore the state. Thus, on backup, the file protection service API is called to determine the protected system files. On restore, the restore mechanism needs to restore the catalog 72 before it can restore the protected system files. Note that the backup mechanism can save the names of the protected system files, whereby the restore mechanism does not have to call the API to determine which files are protected.

The setup installer 90 (SETUPAPI) includes a device installer 108, which is a plug and play (PNP) component that is responsible for installing the software responsible for supporting a given device. For example, files that need to be copied, registry modifications, interactions with the plug and play manager component are controlled by the device installer 108, which also controls driver signing policies. As described below, certain protected classes of driver files are generally an exception, i.e., are "less-protected" than other protected system files, to allow their installation (following a warning) even though protected.

Turning to an explanation of the present invention with particular reference to the flow diagrams of FIGS. 4–9, FIGS. 4–7 describe the operation of the various components described above to perform file protection in the asynchronous notification alternative in accordance with the present invention. Beginning at step 400 of FIG. 4, the asynchronous notification is received at the file protection service 60 from the notification mechanism 66 when a protected file is changed in some way and then closed, such as after having been opened for read-write access, renamed or deleted. The notification includes the name of the file that changed. Note that in the case of renaming or deletion, the original file copy may be simply restored if one is found that is valid, e.g., there is no new file to check for validity and thus a valid copy is put back, e.g., via FIGS. 5–7, described below. Thus, rather than focus on the rename or delete of a file, the case of a known valid copy having been (possibly) changed by a new copy is generally described hereinafter.

At step 402, the filename is hashed (although it could have been hashed by the notification mechanism 66), and the internal data structure 62 searched for a matching entry to determine whether the file is protected. If no match is found, the file is not protected, and step 404 branches to step 420 where the new file is considered successfully copied and the process ends for this notification. As described above, the search of a balanced binary tree optimized for lookup based on hashed data is very fast on average. As can be readily appreciated, the file protection service thus operates rapidly for non-protected files, which facilitates system performance.

If at step 404 a protected file is identified as having been (possibly) changed, step 404 branches to step 406 wherein a determination is made as to whether the file is one that the file protection service previously had been specifically instructed to let be changed, e.g., is a driver being installed by the device installation mechanism 108 (of the setup installer API 90). Step 406 is described below. If not, at step 408 a cryptographic hash is computed for the new file, e.g., by calling an appropriate one of the cryptographic APIs 70. At step 410, this information is provided to the verify mechanism 68 (which may be an API of the cryptographic API set 70) to test whether the computed hash corresponds to a known good hash stored in the catalog 72. For example, the computed hash (or a pointer thereto) may be passed as a parameter in an API call, whereby the cryptographic APIs 70 search the catalog file for a match, and return a yes or no answer on whether a match is found. If the catalog had a match, step 412 branches to step 420 allow the copy to remain. Alternatively, if at step 412 the computed hash does not correspond to a known good hash stored in the catalog 72, step 412 branches to step 414.

If at step 414 the file has a signature, step 414 branches to step 420 to allow the copy. Otherwise, the new copy should be replaced with a known, verified-as-valid copy, whereby the process continues to FIG. 5 to attempt to restore a verified copy, as described below.

Returning to the situation at step 406 where the file is one that is specifically allowed to be changed by a call, e.g., is a driver being installed by the SETUPAPI 90, step 416 is next executed. More particularly, any time that an unsigned driver package is being installed, (i.e., by the SETUPAPI), and one of the constituent files about to be copied is a protected file, then the user is given a warning prompt (policy is elevated to "Warn") by SETUPAPI to confirm with the user that installation of unsigned files is actually desired. Note that the user may already have been given this warning, if the device installation was in a certifiable class whose default policy is already "Warn." If the user elects to proceed, then SETUPAPI calls the file protection mechanism to tell it to allow the next (unsigned) replacement of this file. Note that if the user does not elect replacement, SETUPAPI will simply not make the initial copy, whereby there is no change and thus no notification for such a file. Alternatively, the file protection service may provide such prompts and allow the user to decide how to proceed. If the file protection process has not been told to ignore the particular file at step 406, the file protection process will branch to step 408 as described above.

At step 416, in one alternative implementation, only trusted components such as SETUPAPI will be allowed to make a call to let a file be allowed to be changed. Note that in one present implementation, steps 416 does not exist, i.e., any component can make such a call. Step 420 represents the successful copying of the new file, i.e., the new file is left as is in the asynchronous case (no restoration takes place).

Figure 4:
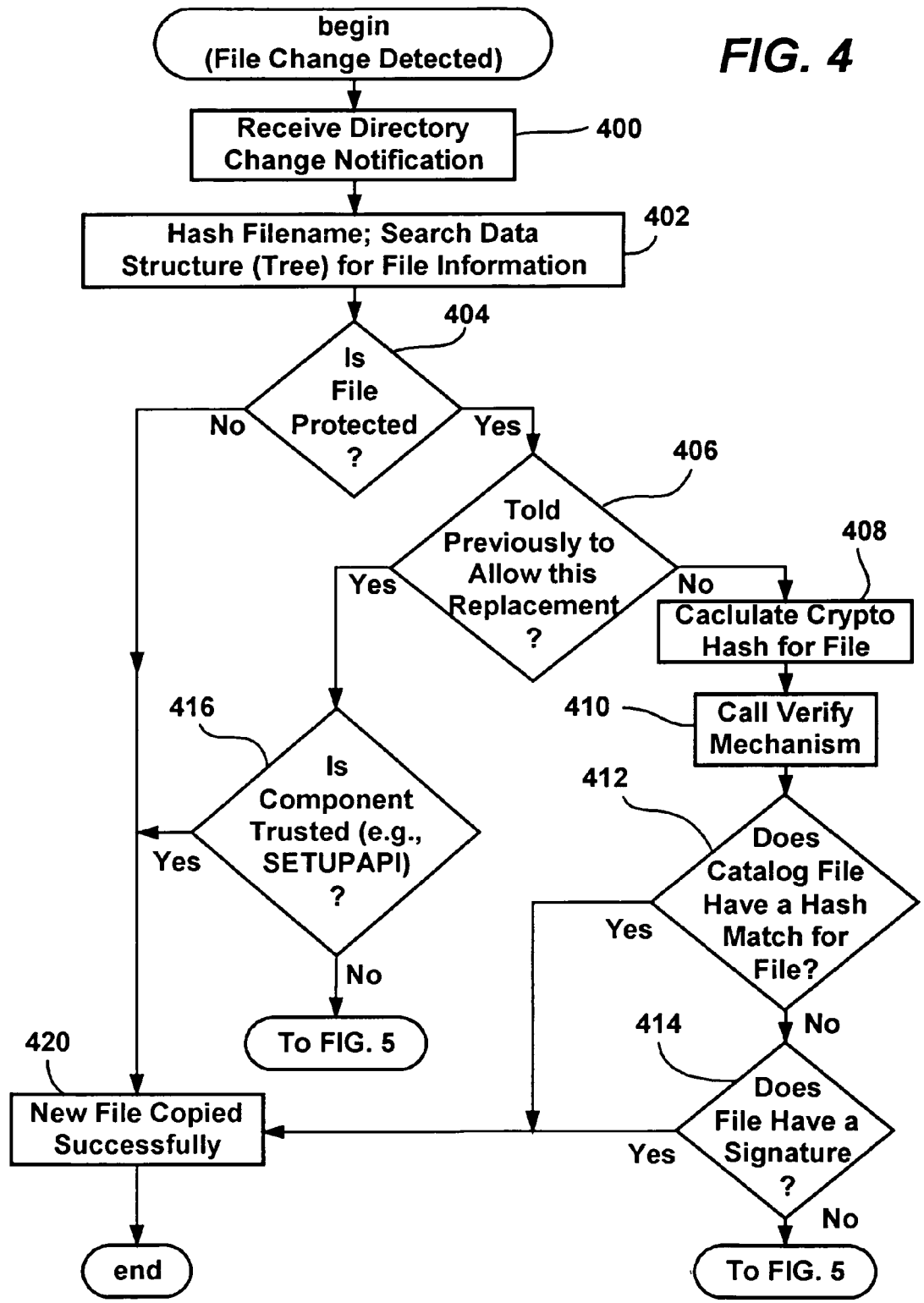
FIGS. 4–7 comprise a flow diagram generally representing one alternative to protect files in response to an asynchronous notification on the close of a file, in accordance with an aspect of the present invention.
Figure 5:
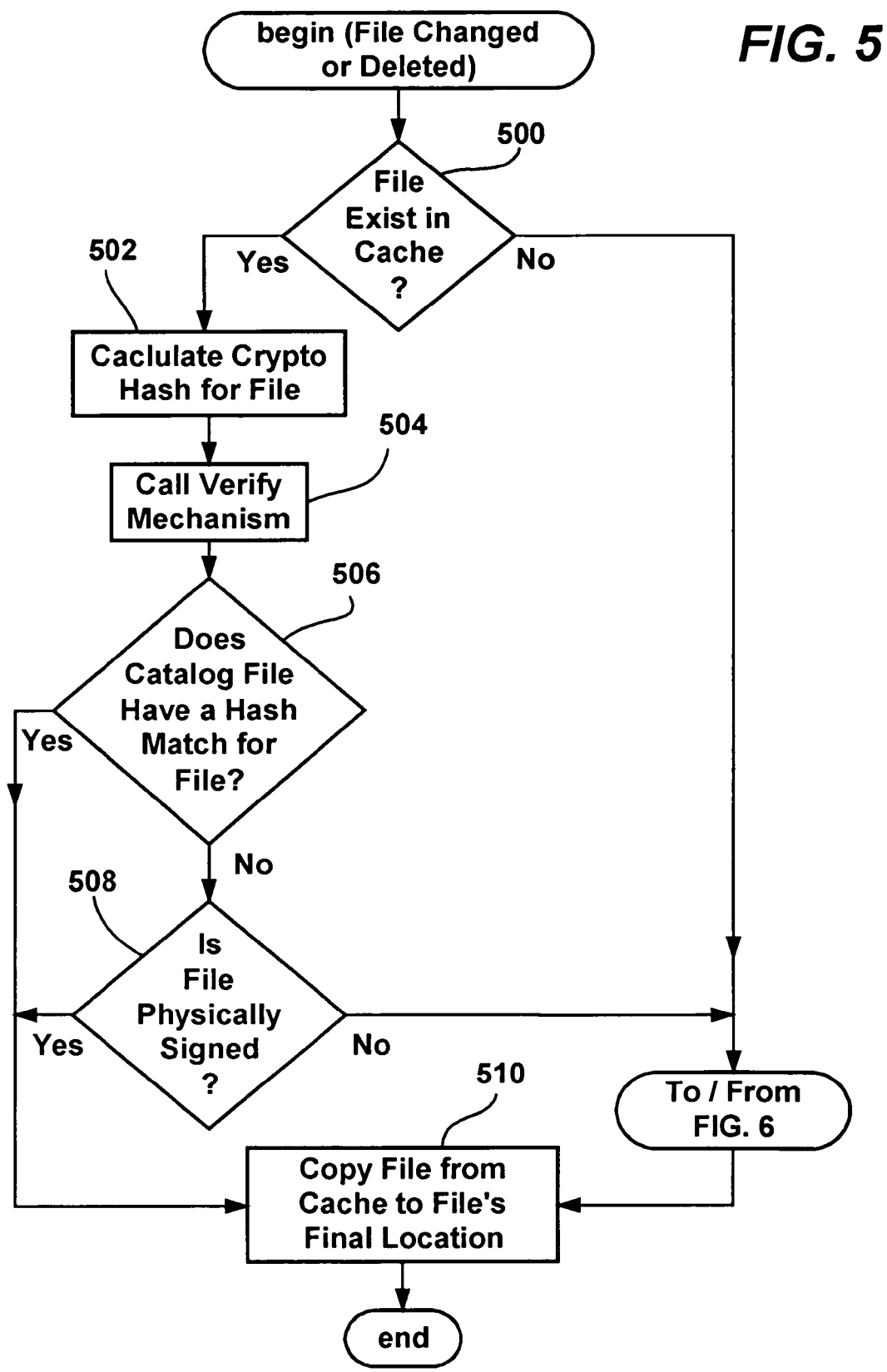

FIG. 5 describes the general steps taken to attempt copy back a valid copy of a protected file when the protected file was changed, but should not have been, according to the above-described process of FIG. 4. At step 500, the file is first looked for in the system cache 78, e.g., via a file system API as is well known. If not found, step 500 branches to step 600 of FIG. 6 to look elsewhere for a valid copy, as described below. If found in the cache 78, the found file copy is verified to determine its validity, via steps 502–506 (similar steps have been described above). If the file's cryptographic hash matched a valid signature, step 506 branches to step 510 where the known valid file is copied over the new file to restore the system to a known stable state. If not valid at step 506 as determined by the comparison of the computed cryptographic hash with the contents of the catalog 72, then a further test as to whether the file is physically signed is performed at step 508. If signed at step 508, the known valid file is copied over the new file at step 510. Otherwise the process continues to step 600 of FIG. 6 to look for another copy of the file that is valid.

Figure 6:
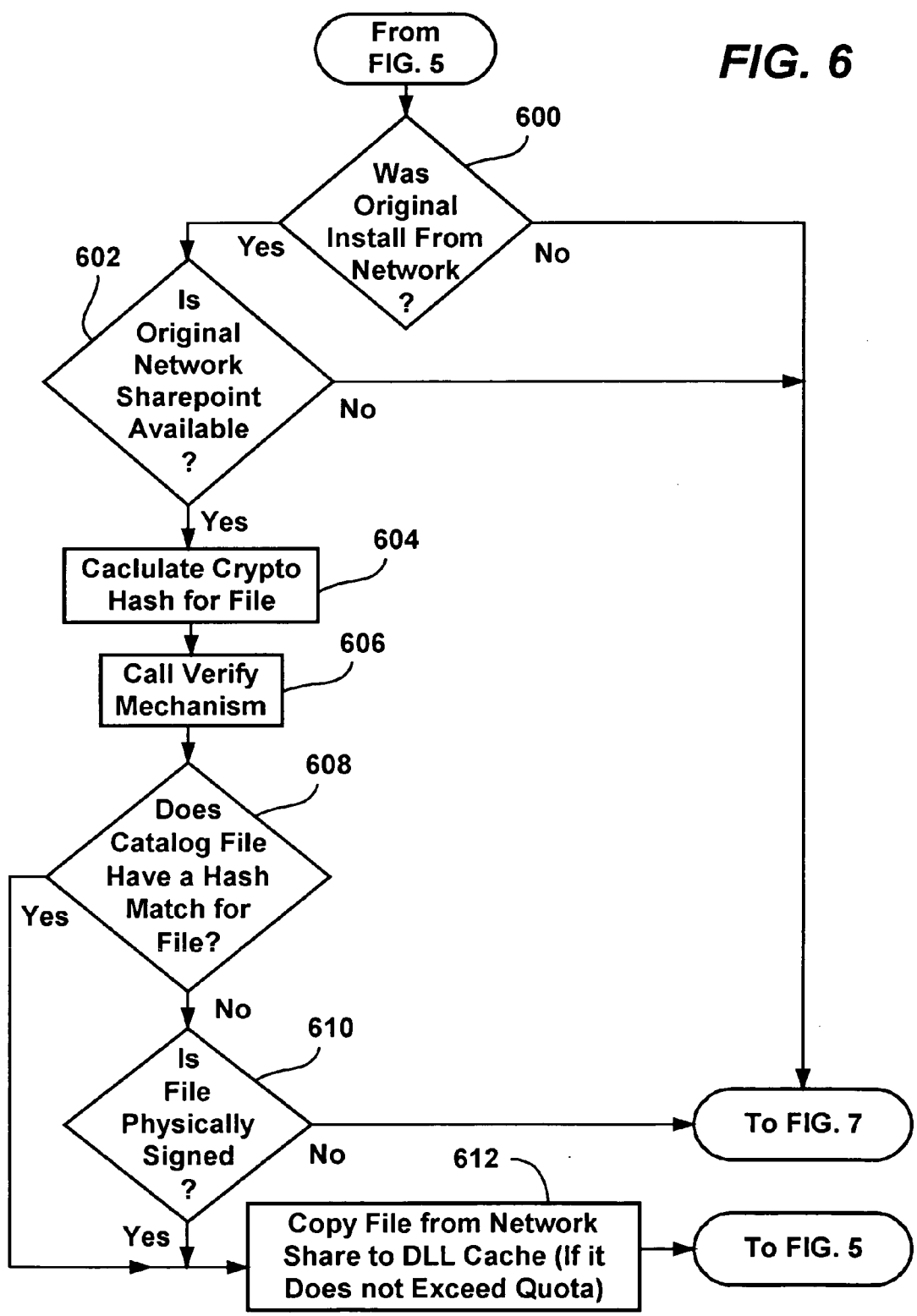

FIG. 6 describes the general steps taken to attempt overwrite a protected file when the protected file was changed, but should not have been, according to the above-described process of FIG. 4, and a valid copy was not found in the cache 78. At step 600, a test is performed to determine whether the original installation was from the network. Note that such information may be stored at the time of install to the local system. If not, step 600 branches to step 700 of FIG. 7 to look elsewhere (e.g., to media such as a CD-ROM, floppy disk, DVD-ROM or the like) as described below. If the original installation was via the network, step 602 is executed to determine if the original network sharepoint 80 (FIG. 2) is currently available. Note that although not shown, the user may be prompted to make a network connection if necessary. If the original network sharepoint is not available at step 602, then step 600 branches to step 700 of FIG. 7 to look for the file on media.

If the original network sharepoint 80 is available at step 602, (and thus a copy of the file is ordinarily found), the file is verified to determine its validity via steps 604–608, i.e., the file is tested to determine if the cryptographic hash of its contents matches a valid entry in the catalog 72. If there is no match, the known valid file is further tested to determine whether it is physically signed at step 610. If the catalog did not have a match at step 608, nor was the file physically signed at step 610, the process continues to step 700 of FIG. 7 to look for the file on media.

If the network share copy of the file matched at step 608 or was itself signed (i.e., the file contained the signature instead of the catalog) at step 610, then the copy is known to be valid, and is copied to the system's (e.g., local) cache 78, if the cache 78 quota permits. Then, step 612 returns to step 510 of FIG. 5 to copy the file from the cache 78 to the file's correct final location, to restore the system to a known stable state. Note that copying it once from the network sharepoint 80 to the cache 78, and then from the cache 78 to the correct is faster than copying both from the network share. Further, note that if the cache quota does not allow the copy, the valid network share file can be directly copied to the file's final location to overwrite the changed file and restore the system to a known stable state.

Figure 7:
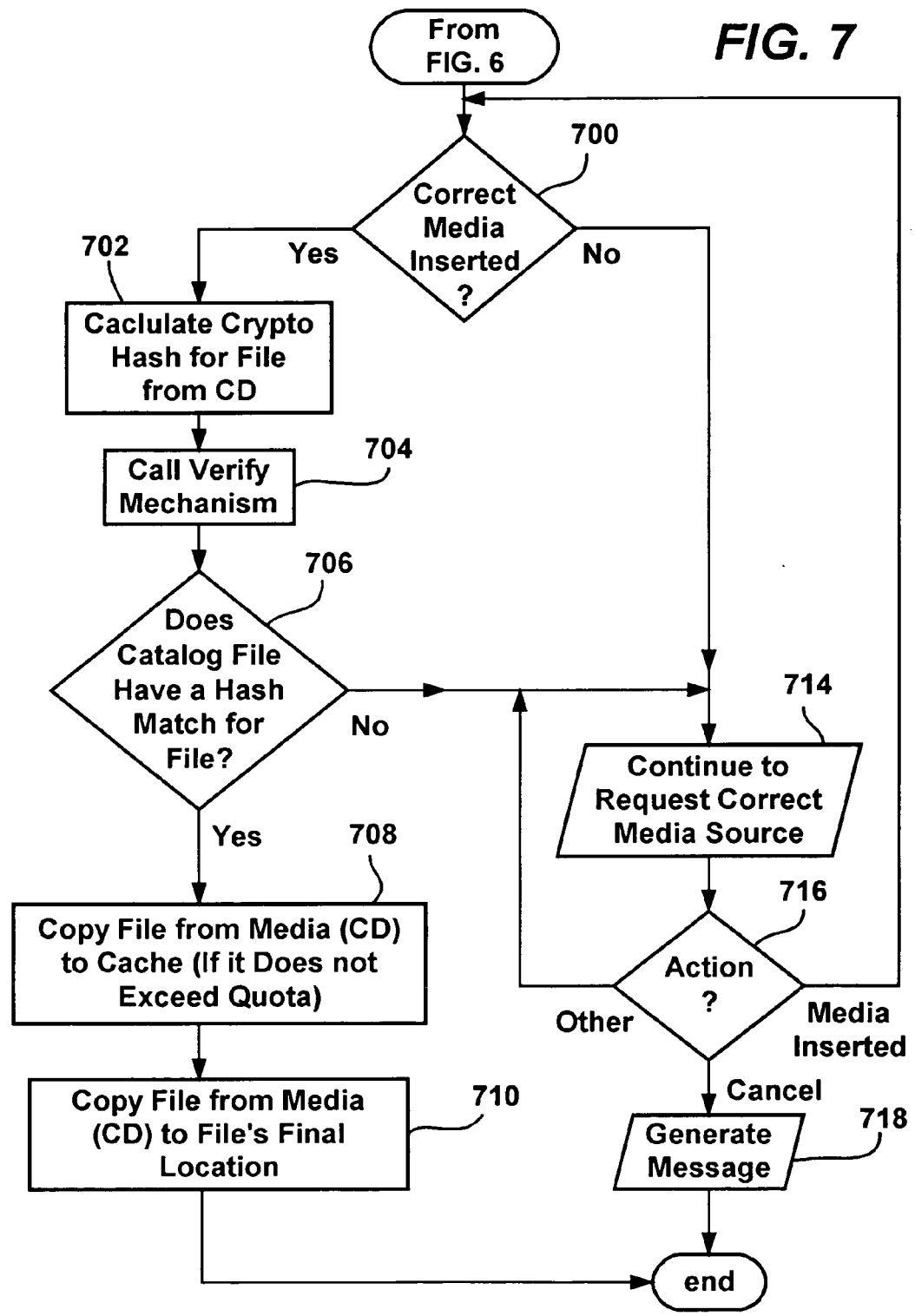

FIG. 7 describes the general steps taken to attempt copy back a valid copy of a protected file when the protected file was changed, but should not have been, according to the above-described process of FIG. 4, and no valid copy was found via the cache or network approaches as described above. At step 700, the correct media is first checked for, e.g., whether a correct CD having a copy of the file is installed in a suitable media player 84. If not, step 700 branches to step 714 to prompt for the correct media. Step 716 represents some action being taken, e.g., media inserted, which returns to step 700 to see if it is the correct one, or the user has canceled, in which event a warning prompt will be generated (step 718) to inform the user that the system is unstable before the file protection process ends for this particular file change notification. The "Other" branch from step 718 generally represents waiting for either new media to be inserted or a cancel, although as can be appreciated, the wait may be event driven, rather than an actual loop.

If at step 700 the correct media is present, steps 702–706 verify that the file copy is valid, i.e., its cryptographic hash is calculated and compared with the catalog 72 as described above. If it does not match, step 706 branches to step 714 to request another medium be inserted to attempt to find a valid copy, possibly varying the prompt slightly to inform the user that the version on the particular medium is not the correct one. Steps 714 and 716 (and if appropriate step 718) generally operate as described above.

If the media copy of the file matched at step 706, then the copy is known to be valid, and is copied to the system's (e.g., local) cache 78 at step 708, if the cache 78 quota permits. Then, step 708 continues to step 710 to copy the file from the media to the file's correct final location, to restore the system to a known stable state. Note that often the file could also be copied from the cache 78, but the cache may not have a copy based on its quota, and copying from the media is relatively fast, so it is straightforward to copy from the media twice.

Figure 8:
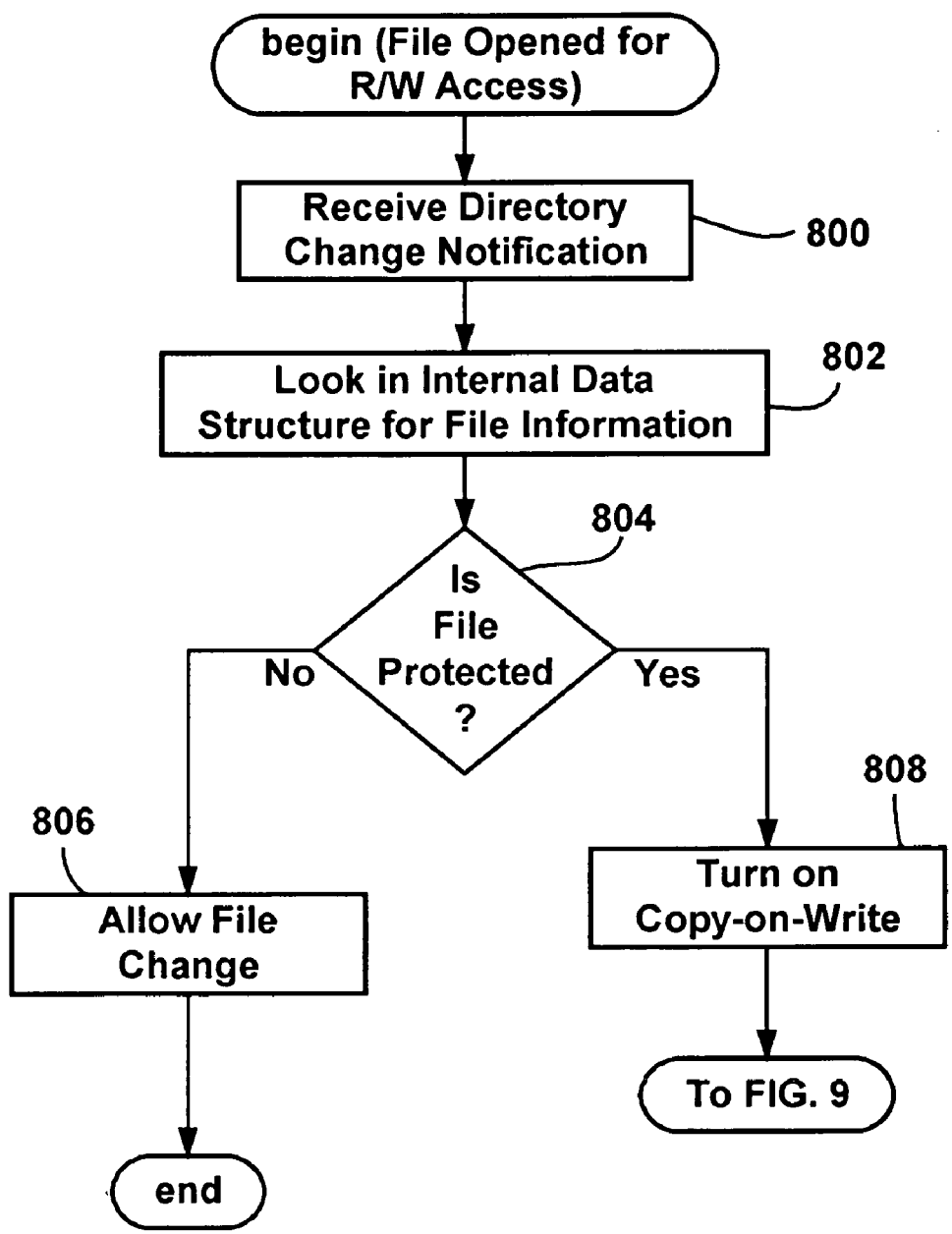
FIGS. 8–9 comprise a flow diagram generally representing another alternative to protect files before the file is changed, in accordance with an aspect of the present invention.
Figure 9:
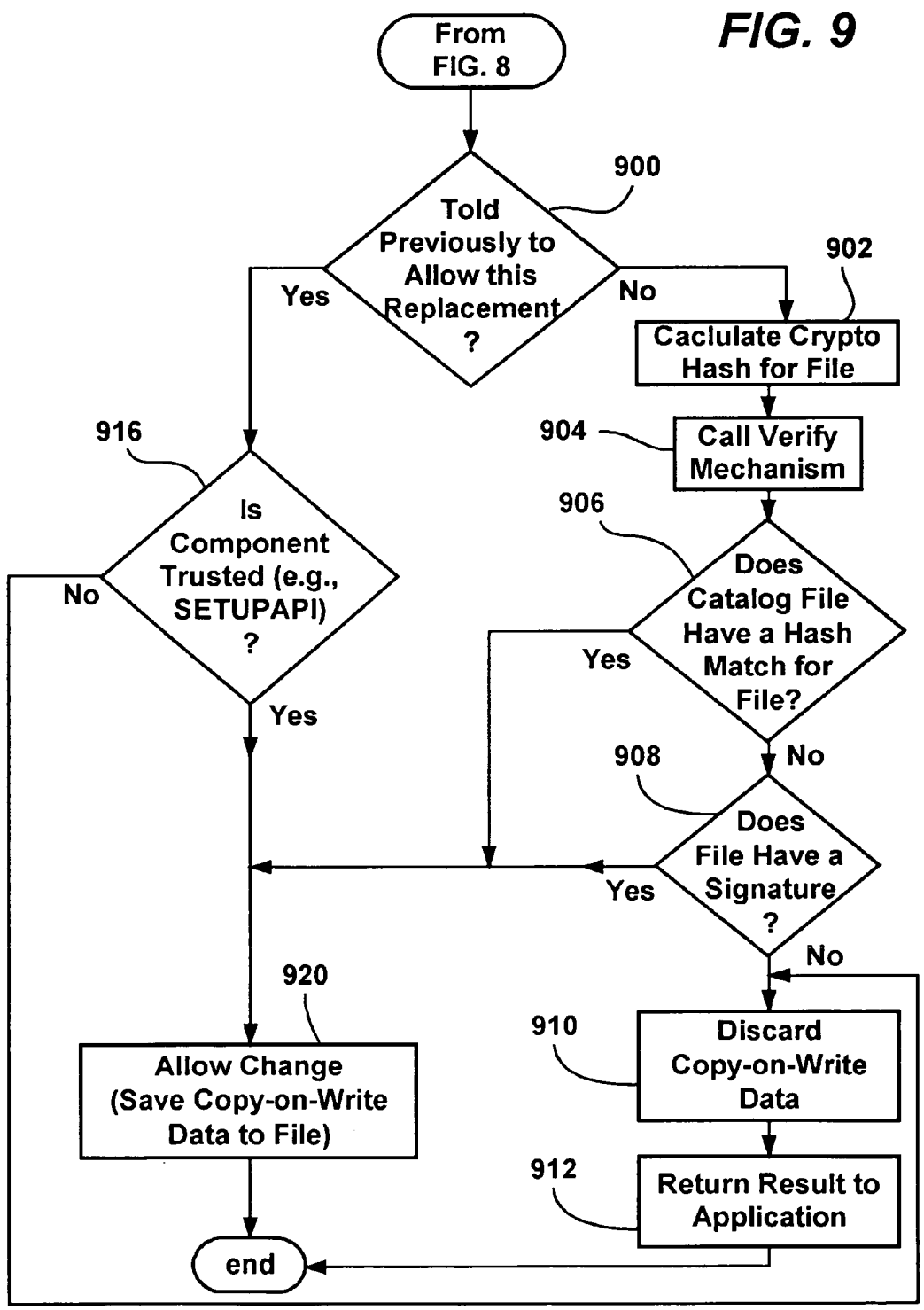

FIGS. 8–9 generally describe the alternative synchronous operation of the various components described above to perform file protection in accordance with the present invention. Note that in the synchronous case, in one alternative, preventing a file from changing is not performed by copying a valid copy back over a changed copy, but rather by preventing the change to the file in the first place. In another synchronous alternative, the known valid copy is allowed to be copied over, but is preserved in a safe location before the copy takes place from where it may be restored.

Such synchronous notification may be accomplished via a filter driver, which for example in the Windows® 2000 operating system is a driver in a stack of drivers that can intercept I/O request packets (IRPs) to the file system to allow, deny or modify requested file operations based on type of operation requested and whether a file (identified in the IRP) is protected. However, it is also possible and somewhat more desirable to build file protection into (or closely coordinate file protection with) the file system.

Step 800–804 of FIG. 8 primarily describes a file protection service that is external to the file system but is closely coordinated therewith, e.g., the service can make callbacks thereto and the file system holds operations (at least for some time) until the callback instructs the file system as to what action to take. However, the IRP model and file system with a built-in file protection service will also be described herein. FIGS. 8 and 9 also describe the copy-on-write process, (as the alternative of preserving the file when synchronous notification of a change about to occur is received is similar to FIG. 4, except that the original file is first preserved in a secure location, and if necessary, restored from that location instead of via FIGS. 5–7).

Beginning at step 800 of FIG. 8, a directory change notification is received by the file protection service 60 when a file is opened, e.g., for read-write access, before a file is changed. Note that a delete or rename operation may be similarly detected and a notification sent to the file protection mechanism 60, which can callback to the file system to fail the requested operation if the file is protected. This straightforward operation is thus is not described herein for purposes of simplicity.

Alternatively, if the file protection service 60 is implemented as a filter driver in the stack, instead of receiving a notification, the file protection service 60 can intercept IRPs to the file system, analyze the information therein, and decide whether to allow the IRP, modify the IRP or send back the IRP with failure information therein based on the requested operation and the file name (or a cached handle). The interception can be in either direction, i.e., on the way to the file system, or on the return therefrom with possibly another IRP sent to the file system by the file protection service. Thus, renames and deletes IRPs on protected files can be failed, while, as described below, writes to protected files can be subject to a copy-on-write process that preserves the writes but does not change the file, until a decision is made to either change the file or discard the change data at the time of file closing.

Step 802 represents the search of the binary tree structure 82 for whether the file to be changed is a protected file. If not as evaluated at step 804, the file change is allowed (or IRP passed intact) at step 806. Otherwise, a copy-on-write process is turned on for writes to this file as represented by step 808. In an alternative implementation, instead of performing the copy-on-write, the original file may be copied to a separate, secure location, whereby the change can take place but be restored directly from that location without needing to search the cache, network and/or CD-ROM and verify the data.

Note that if the file protection service 60 is built into the file system, and a file attribute identifies which files are protected, steps 800–804 may be eliminated, as the file system will immediately know which files are protected. If an attribute is not used, but the file protection service 60 is built into the file system, there is no need for a notification at step 800, and the file system will perform the search at step 802.

If copy-on-write is turned on at step 808, the general logic of FIG. 9 is executed, e.g., at the time of file closing, to determine what to do with the copied data, i.e., whether it should be kept or whether it should be discarded. At step 900, a determination is made as to whether the file is one that the file protection service previously had been specifically instructed to let be changed, e.g., is a driver being installed by the setup API 90, as described above. If not, at step 902 a cryptographic hash is computed for the new file, e.g., by calling an appropriate one of the cryptographic APIs 70. At step 904, this information is provided to the verify mechanism 68 (which may be an API of the cryptographic API set 70) to test whether the computed hash corresponds to a known good hash stored in the catalog 72. If the catalog had a match, step 906 branches to step 916 to determine whether the user should be prompted before allowing the copy as described below. Alternatively, if at step 906 the computed hash does not correspond to a known good hash stored in the catalog 72, step 906 branches to step 908.

If at step 908 the file has a signature, step 908 branches to step 920 to keep the new data. Otherwise, the new data that was copy-on-written is discarded (step 910), and the file installation application (or other process) is provided with a result via step 912.

In cases where the original file is left intact, or restored, a success status indication may be returned as the result to the application at step 912 so that it believes its change was made, when it was not. Alternatively, a failure status indication may be returned to the application. This will normally cause the application install to fail, and notify the user of this problem.

One way to achieve this failure action is to use the security component. For example, the security descriptors of protected files may be marked in a special way, requiring the application process to have a specific capability enabled before a change is allowed. Any application that attempts direct modification of the files will not have this capability enabled, and the security system will reject the modification. For the application to successfully modify the file, a new system service may be provided that performs the cryptographic verification, e.g., in the operating system kernel. If the verification succeeds, the capability is enabled, the system service (not the application) performs the modification, and then the capability is disabled before control is returned to the application.

Returning to the situation at step 900 where the file is a specifically identified file for which installation should be allowed, optional step 916 is reached, which if present evaluates whether the component that requested the change is trusted. If so, step 916 branches to step 920, which represents the copy-on-write data being kept. For example, the file system can accomplish this by manipulating metadata or copying the file allocation units (e.g., clusters) of the new data that were copy-on-written over the old. If not trusted, the file protection process will discard the copy-on-write data at step 910.

Note that the synchronous and asynchronous models can both exist on a given system. For example, the asynchronous model may be used for FAT file system volumes, while the synchronous model may be used with NTFS file system volumes, which can be mixed on one system.

As can be seen from the foregoing, there is provided a method and system that protect the stability of a computer system by protecting selected system files from being changed. The method and system are fast, reliable and extensible, and do not rely on other parties, e.g., to get versioning and backwards compatibility requirements correct.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. In a computer system, a method comprising:
   receiving information indicative of a possible change to a protected file; and
   determining whether the possible change is valid by verifying the file, the verifying performed by a verification mechanism, and if not valid, preventing the possible change from being implemented including discarding the information indicative of the possible change and returning a success to a component.

2. The method of claim 1 wherein receiving information indicative of a possible change includes receiving notification indicative of a change to a protected file.

3. The method of claim 1 wherein receiving information indicative of a possible change includes receiving notification of a change to a file, and accessing information to determine whether the file is protected.

4. The method of claim 1 wherein preventing the change includes overwriting a changed copy of the file with a valid copy of the protected file.

5. The method of claim 1 wherein determining whether the possible change is valid by verifying the file includes obtaining cryptographic hash information of the changed file and comparing the cryptographic hash information against cryptographic hash information associated with the protected file.

6. The method of claim 5 wherein comparing the cryptographic hash information includes accessing a catalog of information for protected files.

7. The method of claim 1 wherein determining whether the possible change is valid includes determining whether the file includes a signature.

8. The method of claim 1 further comprising, monitoring files in a file system.

9. The method of claim 1 wherein preventing the possible change includes copying a valid copy of the protected file to a former location of the protected file.

10. The method of claim 9 wherein copying a valid copy of the protected file includes finding a file having the same identity as the protected file.

11. The method of claim 10 wherein finding the file having the same identity as the protected file includes accessing a cache.

12. The method of claim 11 further comprising verifying the file having the same identity.

13. The method of claim 10 wherein finding the file having the same identity as the protected file includes accessing a network.

14. The method of claim 13 further comprising verifying the file having the same identity.

15. The method of claim 14 wherein finding the file having the same identity as the protected file includes accessing a recorded medium.

16. The method of claim 15 further comprising verifying the file having the same identity.

17. The method of claim 1 further comprising receiving information indicating that a protected file is about to be changed, preserving a copy of the protected file, and wherein preventing the possible change includes overwriting a changed copy of the file with a copy of the protected file that was preserved.

18. A computer-readable medium having computer-executable instructions, comprising:
   (1) selecting a plurality of files as protected files;
   (2) receiving information indicative of a possible change to a protected file;
   (3) determining whether the file is an exception case, and
      (a) if an exception case, allowing the change, or
      (b) if not an exception case, determining whether the possible change is valid by verifying the file, the verifying performed by a verification mechanism, and
         (i) if valid, allowing the possible change to be implemented; and
         (ii) if not valid, preventing the possible change from being implemented; and
   (4) returning information indicative of a success.

19. The computer-readable medium of claim 18 wherein receiving information indicative of a possible change includes receiving notification indicative of a change to a protected file.

20. The computer-readable medium of claim 18 wherein receiving information indicative of a possible change includes receiving notification of a change to a file, and accessing information to determine whether the file is protected.

21. The computer-readable medium of claim 18 wherein preventing the possible change includes overwriting a changed copy of the file with a valid copy of the protected file.

22. The computer-readable medium of claim 18 wherein preventing the possible change includes discarding change data.

23. The computer-readable medium of claim 18 wherein allowing the possible change includes writing data saved via a copy-on-write process to the file.

24. The computer-readable medium of claim 18 wherein determining whether the file is an exception case includes checking a security descriptor of the file.

25. The computer-readable medium of claim 18 further comprising providing a prompt before allowing a possible change.

26. The computer-readable medium of claim 18 wherein determining whether the possible change is valid includes obtaining cryptographic hash information of the changed file, and comparing the cryptographic hash information against cryptographic hash information associated with the protected file.

27. The computer-readable medium of claim 18 wherein determining whether the possible change is valid includes determining whether the file includes a signature.

28. A computer system, comprising,
   a protected file,
   a detection mechanism configured to determine when the protected file may be changed by a possible change,
   a verification mechanism; and
   a file protection service, the file protection service configured to receive a determination from the detection mechanism that the protected file may be changed, and further configured to communicate with the verification mechanism to verify whether the possible change is valid, and to prevent the possible change from being implemented by discarding the possible change when the possible change is not valid.

29. The computer system of claim 28 wherein the detection mechanism includes a mechanism for monitoring at least one directory for changes to at least one file therein.

30. The computer system of claim 28 wherein the detection mechanism provides a notification to the file protection service as the determination mechanism that the protected file may be changed.

31. The computer system of claim 28 wherein the file protection service accesses a data structure to determine whether the notification received from the detection mechanism corresponds to a protected file.

32. The computer system of claim 28 wherein the file protection service is incorporated into a file system.

33. The computer system of claim 28 wherein the file protection service returns information indicative of a success.

34. The computer system of claim 28 wherein the verification mechanism verifies whether the possible change to a file is valid by comparing a cryptographic hash of the file contents against a cryptographic hash associated with a valid file.

35. The computer system of claim 34 wherein the cryptographic hash associated with a valid file is maintained in a data structure including a cryptographic hash of the contents of at least one other protected file.

36. A computer system, comprising,
a protected file,
a detection mechanism configured to determine when the protected file may be changed by a possible change;
a verification mechanism; and
a file protection service, the file protection service configured to receive a determination from the detection mechanism that the protected file may be changed, and further configured to communicate with the verification mechanism to verify whether the possible change is valid, and to prevent the possible change from being implemented by locating valid data in a system cache and copying the valid data over changed data when the possible change is not valid.

37. The computer system of claim 36 further comprising a scanning mechanism for causing a plurality of files to trigger the detection mechanism.

38. A computer system, comprising,
a protected file,
a detection mechanism configured to determine when the protected file may be changed by a possible change;
a verification mechanism; and
a file protection service, the file protection service configured to receive a determination from the detection mechanism that the protected file may be changed, and further configured to communicate with the verification mechanism to verify whether the possible change is valid, and to prevent the possible change from being implemented by locating valid data at a network share and copying the valid data over changed data when the possible change is not valid.

39. A computer system, comprising,
a protected file,
a detection mechanism configured to determine when the protected file may be changed by a possible change;
a verification mechanism; and
a file protection service, the file protection service configured to receive a determination from the detection mechanism that the protected file may be changed, and further configured to communicate with the verification mechanism to verify whether the possible change is valid, and to prevent the possible change from being implemented by locating valid data in a recorded medium and copying the valid data over changed data when the possible change is not valid.

* * * * *

UNITED STATES PATENT AND TRADEMARK OFFICE
CERTIFICATE OF CORRECTION

PATENT NO. : 6,971,018 B1
APPLICATION NO. : 09/560788
DATED : November 29, 2005
INVENTOR(S) : Wesley A. Witt et al.

It is certified that error appears in the above-identified patent and that said Letters Patent is hereby corrected as shown below:

In column 1, line 48, delete "=become" and insert -- become --, therefor.

In column 5, line 26, delete "DLLS" and insert -- DLLs --, therefor.

In column 6, line 14, delete "filesystem" and insert -- file system --, therefor.

Signed and Sealed this

Thirtieth Day of March, 2010

David J. Kappos
*Director of the United States Patent and Trademark Office*